(12) United States Patent
Essig et al.

(10) Patent No.: US 6,468,149 B2
(45) Date of Patent: Oct. 22, 2002

(54) AIR VENT FOR A VEHICLE

(75) Inventors: Richard C. Essig, Berthhoud, CO (US); John P. Vanderhoef, Hyannis, MA (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 09/955,721

(22) Filed: Sep. 18, 2001

(65) Prior Publication Data

US 2002/0014781 A1 Feb. 7, 2002

Related U.S. Application Data

(62) Division of application No. 09/702,555, filed on Oct. 31, 2000, now Pat. No. 6,309,007.
(60) Provisional application No. 60/162,661, filed on Nov. 1, 1999, now abandoned.

(51) Int. Cl.[7] .................................................. B60H 1/26
(52) U.S. Cl. ........................ 454/164; 454/82; 454/115; 454/118; 454/359
(58) Field of Search ............................. 454/78, 79, 80, 454/82, 88, 115, 118, 162, 164, 165, 339, 359

(56) References Cited

U.S. PATENT DOCUMENTS

| | | | |
|---|---|---|---|
| 1,064,951 A | * 6/1913 | Wofford | ...................... 236/45 |
| 2,682,427 A | 6/1954 | Bright | |
| 3,259,051 A | * 7/1966 | Boche et al. | ................ 454/137 |
| D257,531 S | 11/1980 | Hickman et al. | |
| 4,238,876 A | * 12/1980 | Monroe et al. | |
| D267,487 S | 1/1983 | Ragsdale | |
| D268,408 S | 3/1983 | Ruggles | |
| 4,514,891 A | * 5/1985 | Draper | |
| 4,592,586 A | * 6/1986 | Yagami et al. | |
| 4,595,230 A | * 6/1986 | Fettes | |
| D291,676 S | 9/1987 | Noble | |
| 4,691,623 A | * 9/1987 | Mizusawa | |
| 4,767,154 A | * 8/1988 | Okamoto et al. | |
| 4,784,431 A | * 11/1988 | Ohhashi et al. | |
| D304,436 S | 11/1989 | Pike | |
| 4,930,835 A | 6/1990 | Bruce et al. | |
| 5,016,935 A | * 5/1991 | Semple | |
| D324,196 S | 2/1992 | Muth | |
| 5,167,573 A | * 12/1992 | Kanno et al. | |
| 5,193,874 A | * 3/1993 | German et al. | |
| D342,470 S | 12/1993 | Lomax, Jr. et al. | |
| 5,314,225 A | 5/1994 | Gordon | |
| 5,360,254 A | * 11/1994 | Sorimachi et al. | |
| 5,383,702 A | * 1/1995 | Matheson | |
| 5,501,052 A | * 3/1996 | Saji | |
| D383,710 S | 9/1997 | Guichard et al. | |
| D389,094 S | 1/1998 | Stollery | |
| D391,900 S | 3/1998 | Skoog | |
| 5,725,273 A | 3/1998 | Vernon et al. | |
| 5,738,405 A | * 4/1998 | Richters et al. | |
| 5,823,870 A | * 10/1998 | Emerling et al. | ...... 137/512.15 |
| D408,781 S | 4/1999 | Gordon | |
| 6,003,936 A | 12/1999 | Gordon | |
| 6,059,356 A | * 5/2000 | Hoelzel et al. | |
| 6,203,100 B1 | * 3/2001 | Gordon | |

FOREIGN PATENT DOCUMENTS

| | | | |
|---|---|---|---|
| CA | 694957 | * 9/1964 | ................. 454/359 |
| JP | 62-4622 | * 1/1987 | ................. 454/164 |
| SU | 137914 | * 2/1988 | ................. 454/359 |

OTHER PUBLICATIONS

"Ultima Hard Tops", *Steel Horse Automotive,* one page.

* cited by examiner

*Primary Examiner*—Harold Joyce
(74) *Attorney, Agent, or Firm*—W. Scott Carson

(57) ABSTRACT

A two-piece hardtop for sport utility vehicles. An air vent is provided that allows air to flow out from the interior of the vehicle without letting water enter the vehicle through it.

7 Claims, 11 Drawing Sheets

AIR VENT FOR A VEHICLE

RELATED PATENT APPLICATIONS

This application is a division of U.S. patent application Ser. No. 09/702,555 filed Oct. 31, 2000 U.S. Pat. No 6,309,007, which claims the benefit of U.S. Provisional Patent Application Serial No. 60/162,661 filed Nov. 1, 1999, now abandoned.

BACKGROUND OF THE INVENTION

1. Field of the Invention

This invention relates to the field of hardtops for sport utility vehicles and more particularly to the field of two-piece hardtops for such vehicles.

2. Discussion of the Background

Sport utility vehicles have become very popular, particularly ones with removable tops. Such removable tops can be either hard or soft and can be made of single or multiple pieces. Soft tops of canvas or vinyl are relatively simple to put on and take off the vehicle as they are lightweight and flexible. Hardtops on the other hand offer more challenges as they tend to be heavier and more cumbersome to handle, particularly one-piece hardtops. As compared to such unitary hardtops, two-piece tops offer the basic advantage that they are easier to manipulate. They also allow the user the option of removing both pieces at once or just the front piece to give different open air experiences. However, unlike one-piece hardtops, two-piece ones present the need to have an effective securing and sealing arrangement between the two pieces. An effective seal is particularly important because the two pieces are normally joined together right above the driver and front passenger and any leak between the two pieces will drip directly on them.

With this in mind, the present invention was developed. The invention provides improved securing and sealing arrangements between the front and rear roof sections of a removable, two-piece hardtop for sport utility vehicles.

SUMMARY OF THE INVENTION

This invention involves a two-piece hardtop for sport utility vehicles. The hardtop has front and rear roof sections that are removably securable to each other. The front and rear sections have overlapping portions, each of which has an inverted U-shape with vertically extending legs and a horizontally extending base between them. The U-shapes nest together with side latches being provided between adjacent legs of the front and rear sections to draw the two pieces vertically together and secure them in place.

Other features of the invention include a sealing member that is positioned between the nested roof sections and a gutter that is created between the sealing member and the rear roof section. The gutter helps to effectively direct water away from between the two roof sections and the vehicle. Additionally, an improved air vent is provided that allows air to flow out from the interior of the vehicle without letting water enter the vehicle through it.

DETAILED DESCRIPTION OF THE PREFERRED EMBODIMENTS

Figure 1:
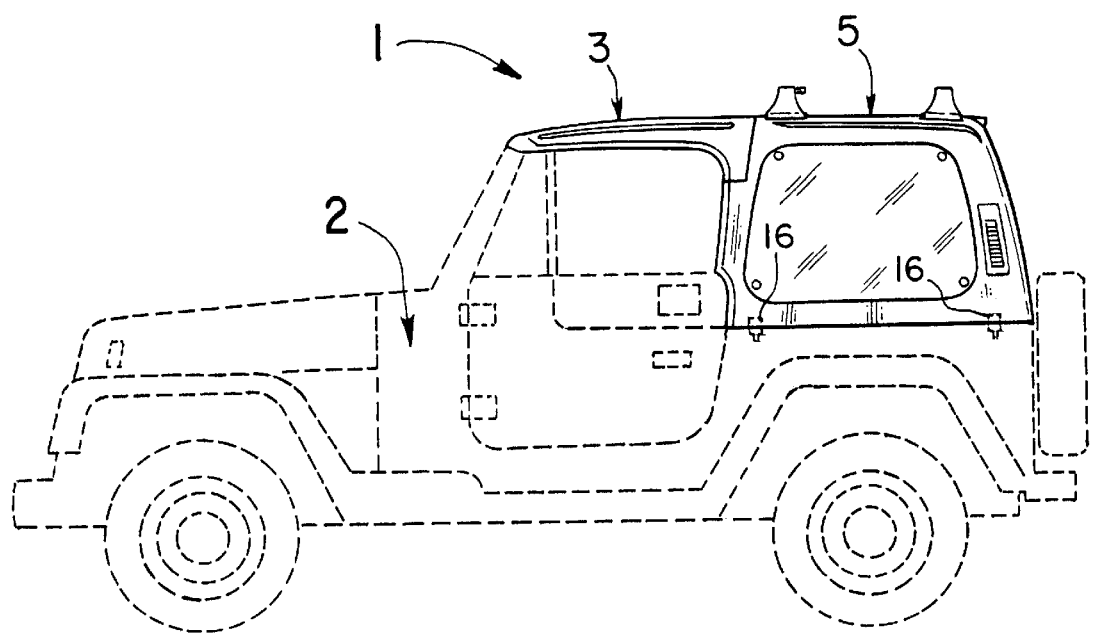
FIG. 1 is a side elevational view of the two-piece hardtop of the present invention mounted on a sport utility vehicle.
Figure 2:
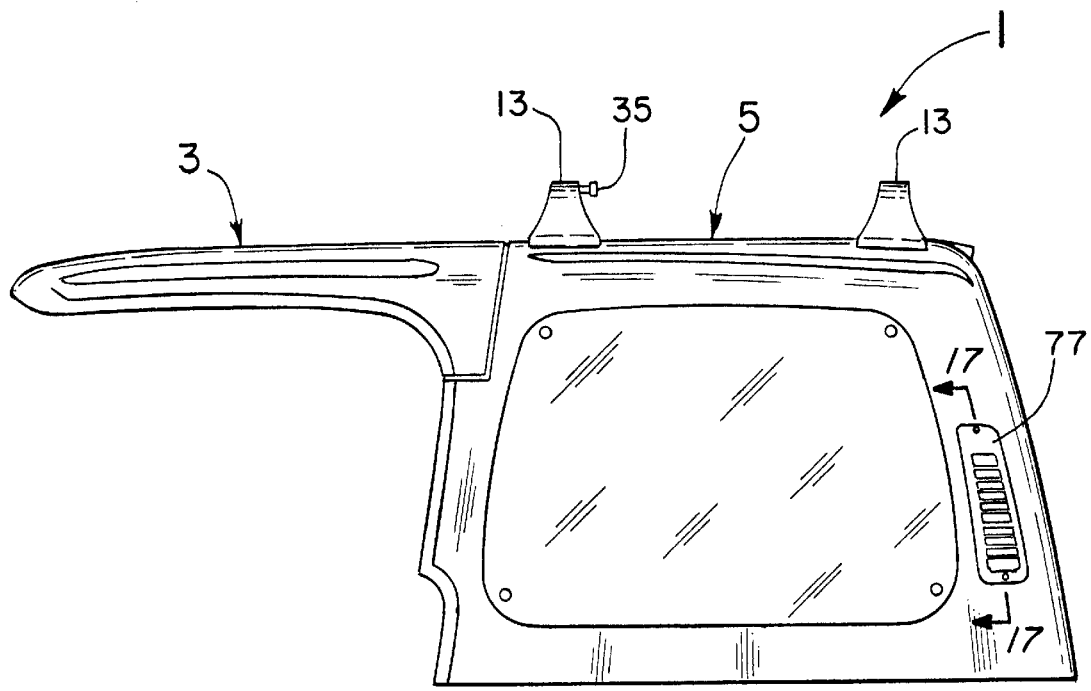
FIG. 2 is an enlarged view of the two pieces of the top secured together.
Figure 3:
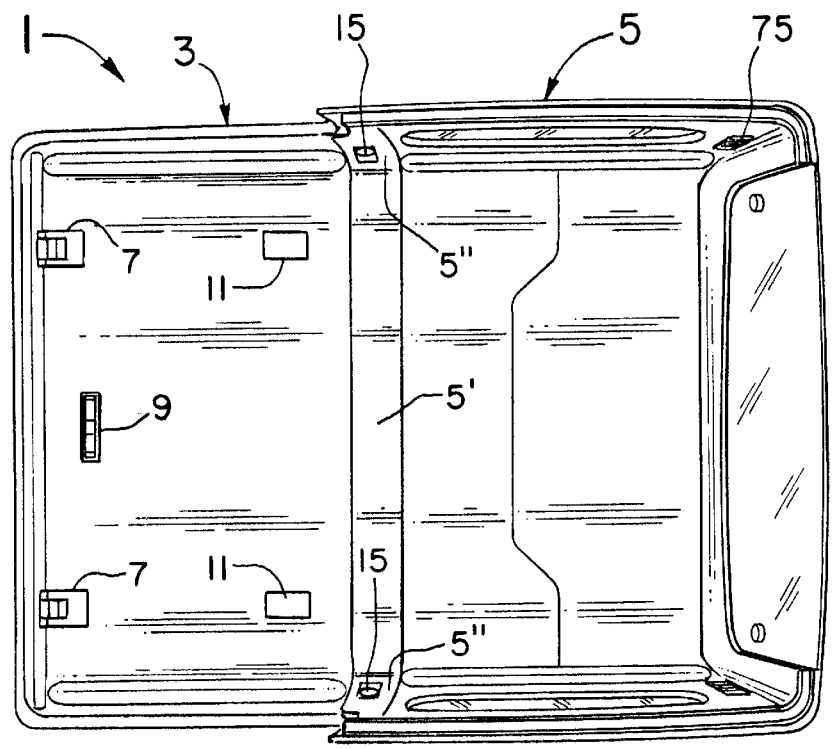
FIG. 3 is a bottom plan view of the assembled top.
Figure 4:
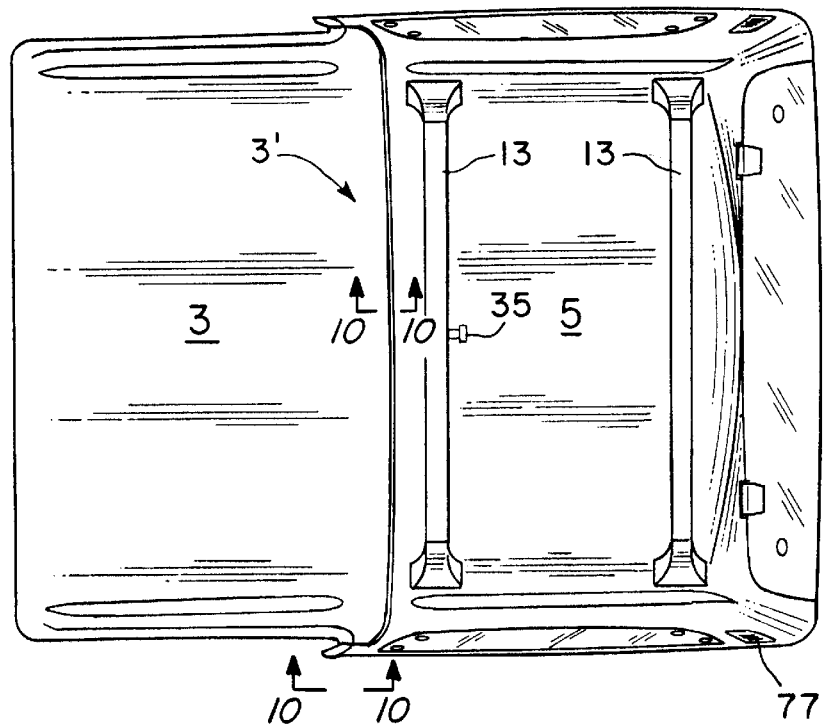
FIG. 4 is a top plan view thereof.
Figure 5:
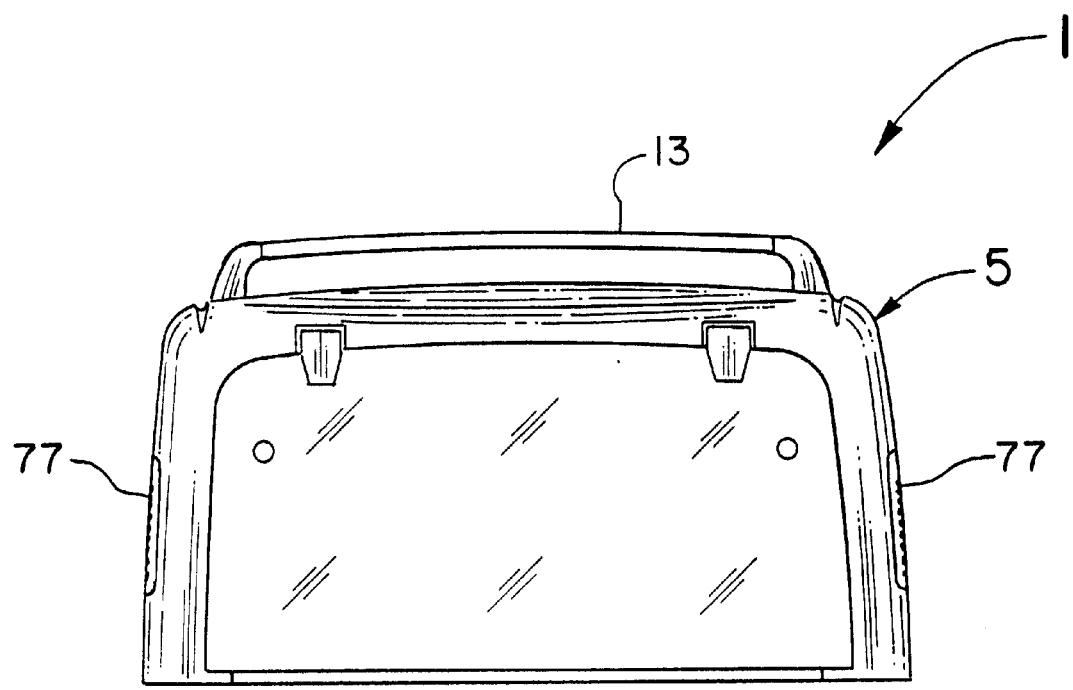
FIG. 5 is a rear elevational view thereof.
Figure 6:
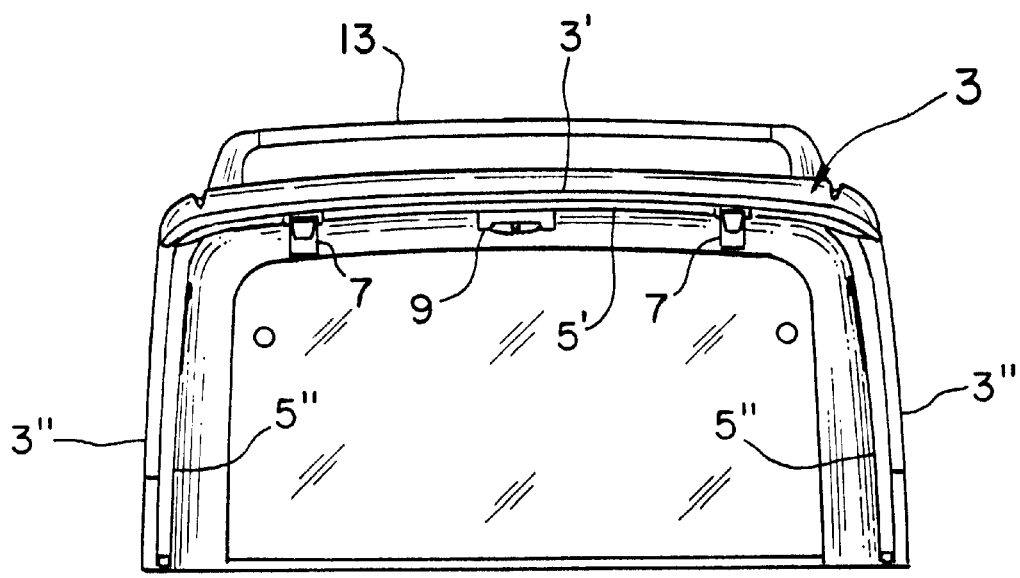
FIG. 6 is a front elevational view thereof.

As shown in FIG. 1, the present invention involves a two-piece hardtop 1 for a sport utility vehicle 2. The multi-piece hardtop 1 is completely removable from the passenger vehicle 2 (see FIG. 2) and has front and rear roof sections 3 and 5 that are also removably securable to each other. The front roof section 3 as shown in FIG. 1 is positionable over the forward area of the vehicle where the driver and front passenger would sit. The rear roof section 5 in turn is positionable over the rearward area of the vehicle 2. When secured to each other, the front and rear roof sections 3 and 5 of the hardtop 1 have the overall appearance shown in FIGS. 2–6. FIG. 2 in this regard is a side elevational view of the assembled hardtop 1. FIG. 3 is a bottom plan view, FIG. 4 is a top plan view, FIG. 5 is a rear elevational view, and FIG. 6 is a front elevational view.

Referring again to FIG. 3 and as explained in more detail below, the underside of the front roof section 3 of the hardtop 1 has a pair of windshield clamp members 7 and an arrangement of clamp members 9 and 11 for securing the removable front roof section 3 to the roof rack members 13 on the rear roof section 5. Side latches 15 are also provided on each B-pillar or leg 5" of the rear roof section 5 of the hardtop 1 and are used to grip and pull the front roof section 3 downwardly into the fully engaged position with the rear roof section 5.

Figure 7:
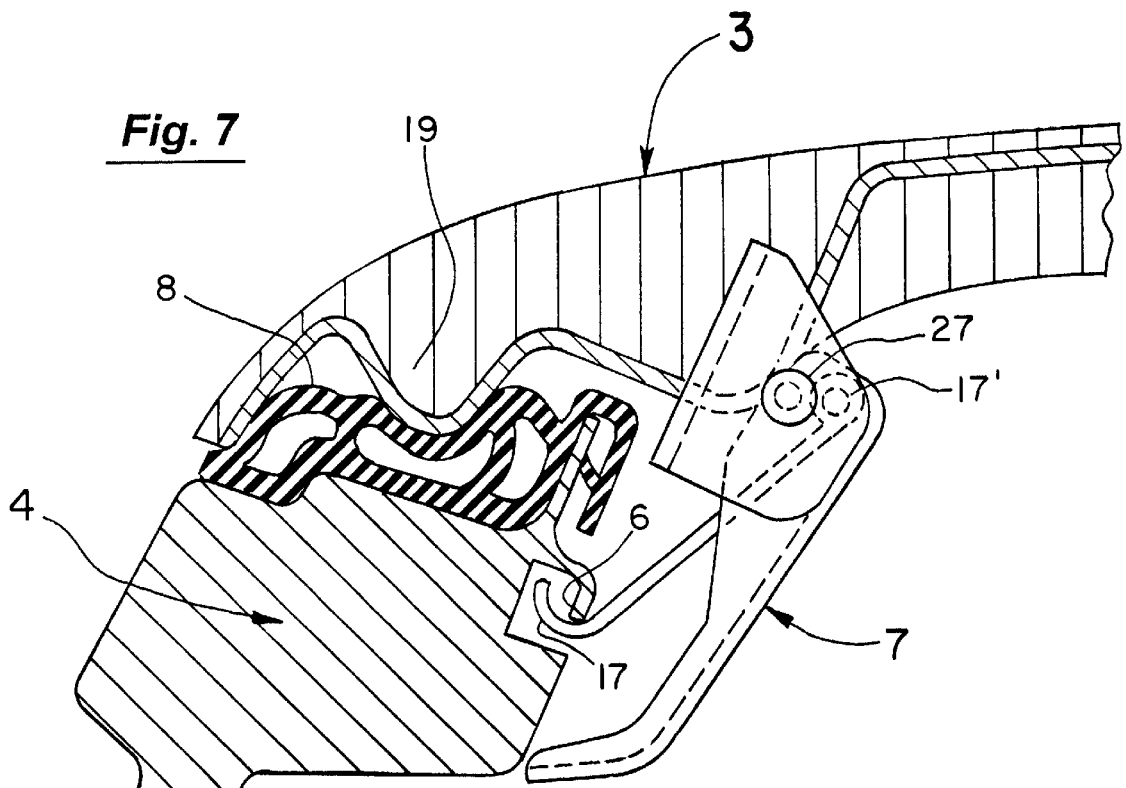
FIG. 7 is an enlarged view of the front roof section of the top showing how it can be removably attached to the windshield of the vehicle.
Figure 8:
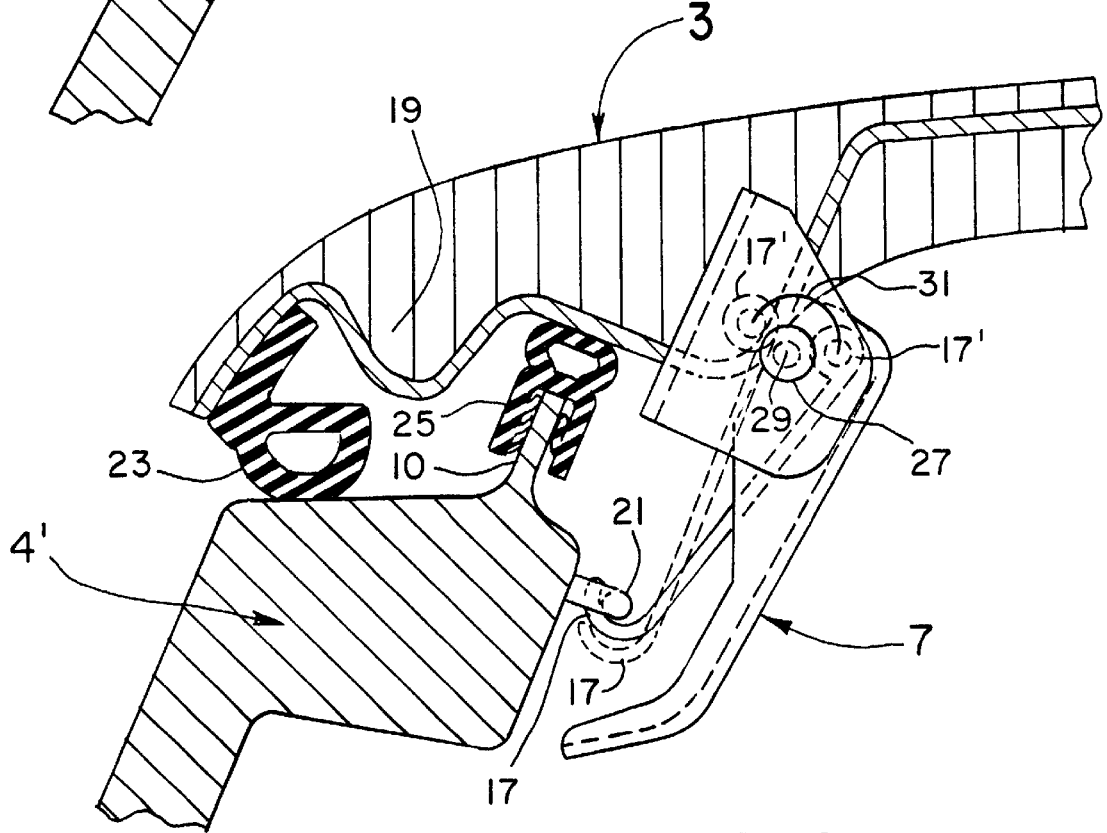
FIG. 8 is a view similar to FIG. 7 showing another manner in which the front roof section can be removably attached to a vehicle with a different windshield configuration.

More specifically and as best seen in FIGS. 3, 7, and 8, the windshield clamp members 7 on the underside of the front roof section 3 in FIG. 3 serve to attach the front roof section 3 to the vehicle windshields 4 and 4' of FIGS. 7 and 8. In FIG. 7, the overcenter clamp member 7 is shown with the engaging clip 17 received in a slot 6 in the vehicle windshield 4. In this drawn and locked position, the front portion 19 of the front roof section 3 of the hardtop 1 is tightly pulled down against the gasket 8 and compresses the gasket 8 to form a tight seal. In FIG. 8, the clamp member 7 has the clip 17 engaged to a footer or C-shaped pull 21 added to the original equipment of the windshield 4'. Additionally, gaskets 23 and 25 in FIG. 8 are provided in which gasket 23 is preferably secured to the front portion 19 of the front roof section 3 of the hardtop 1 and the gasket 25 is attached over the lip member 10 of the OEM windshield 4'. Each clamp member 7 is positioned between two, longitudinally spaced pivot members 27. In operation, each clamp member 7 pivots about axis 29 along arc 31 (see FIG. 8) between an engaged and locked position (shown in solid lines in FIG. 8) and an extended, unengaged position (shown in dotted lines in FIG. 8). The overcenter aspect of the clamp member 7 occurs in that the base 17' of the clip 17 travels along arc 31 in a known manner from one side to the other of a neutral axis. The neutral axis in this case runs through the clip engagement point 21 and the pivotal axis 29 in FIG. 8. Although this particular clamp 7 is shown, any number of conventional clamps could be used if desired to draw the front roof section 3 and windshields 4 and 4' together.

Figure 9:
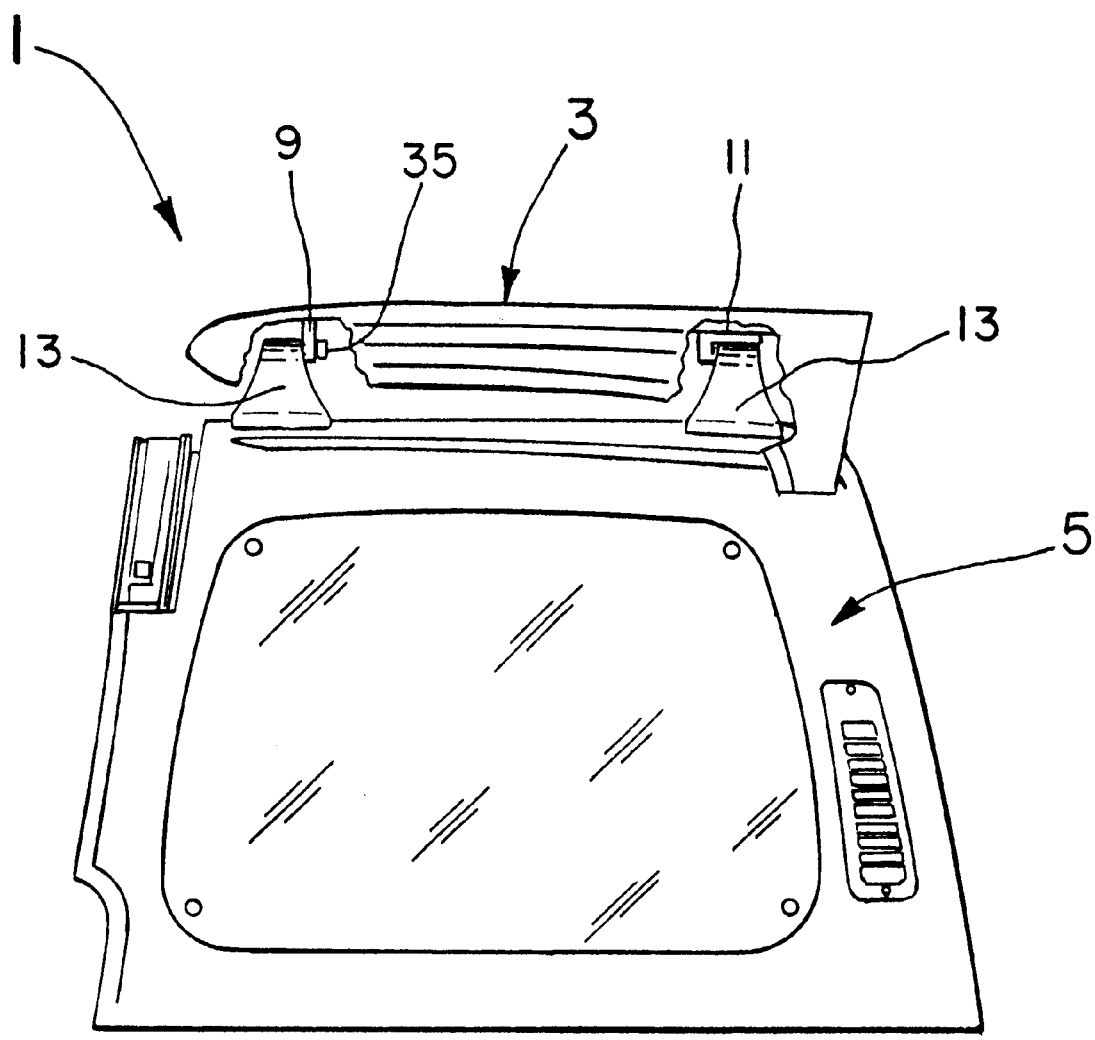
FIG. 9 is a view of the two pieces of the top stacked on each other.

The front roof section 3 of the hardtop 1 is removable from the rear roof section 5 and can be attached to the roof rack members 13 (see FIG. 9) by the arrangement of clamp member 9/pin 35 and C-shaped clamp members 11. This is done essentially in the manner of co-owned U.S. Pat. No. 5,725,273 incorporated herein by reference. The front roof section 3 can also be removed and stored separately from the rear roof section 5 if desired. If storage on the rear roof section 5 is not desired, the roof rack members 13 and the clamps 9 and 11 as well as the pin 35 could be eliminated from the hardtop 1.

Figure 10:
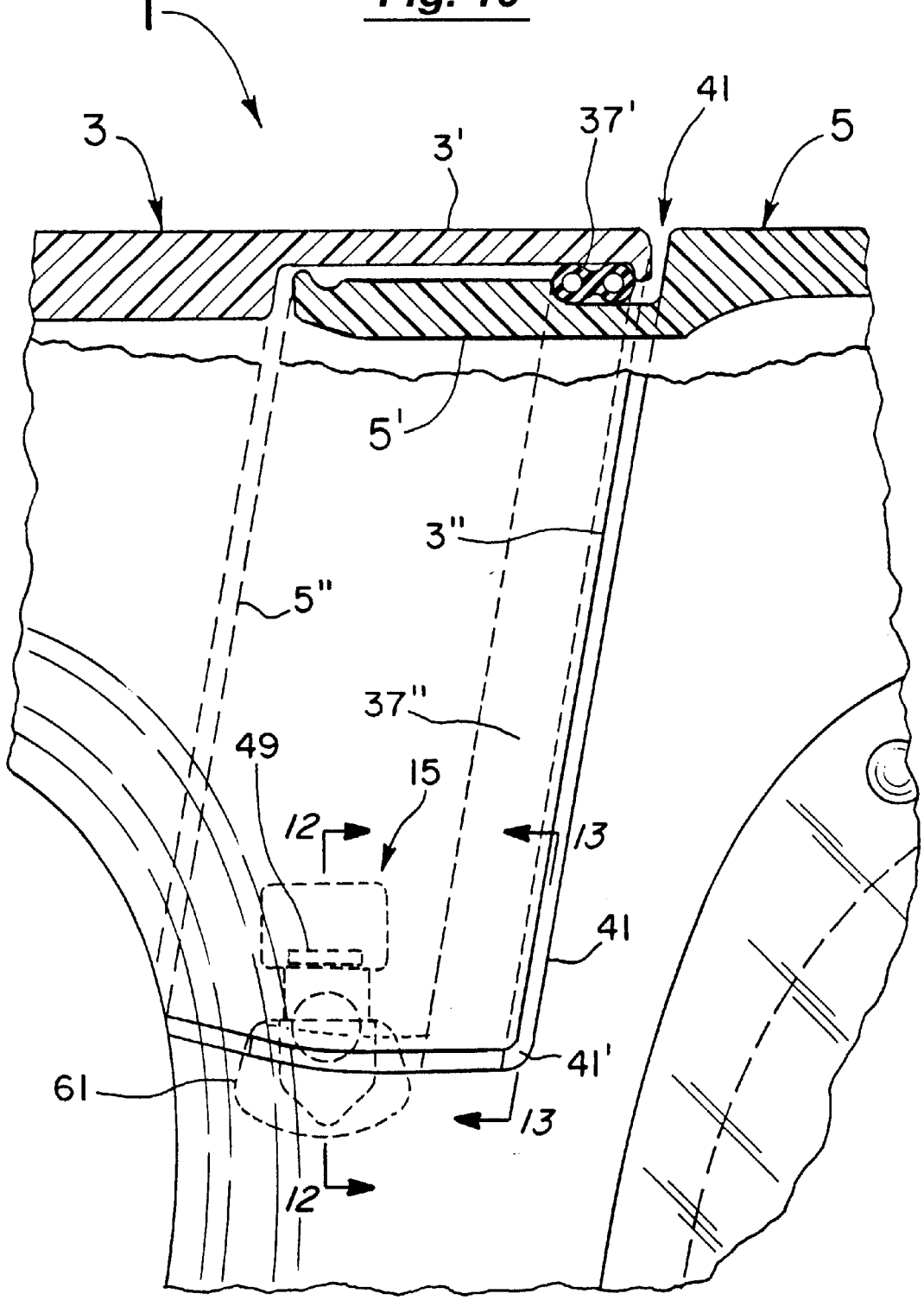
FIG. 10 is a view taken along lines 10—10 of FIG. 4 showing the overlapping portions of the front and rear roof sections.
Figure 11:
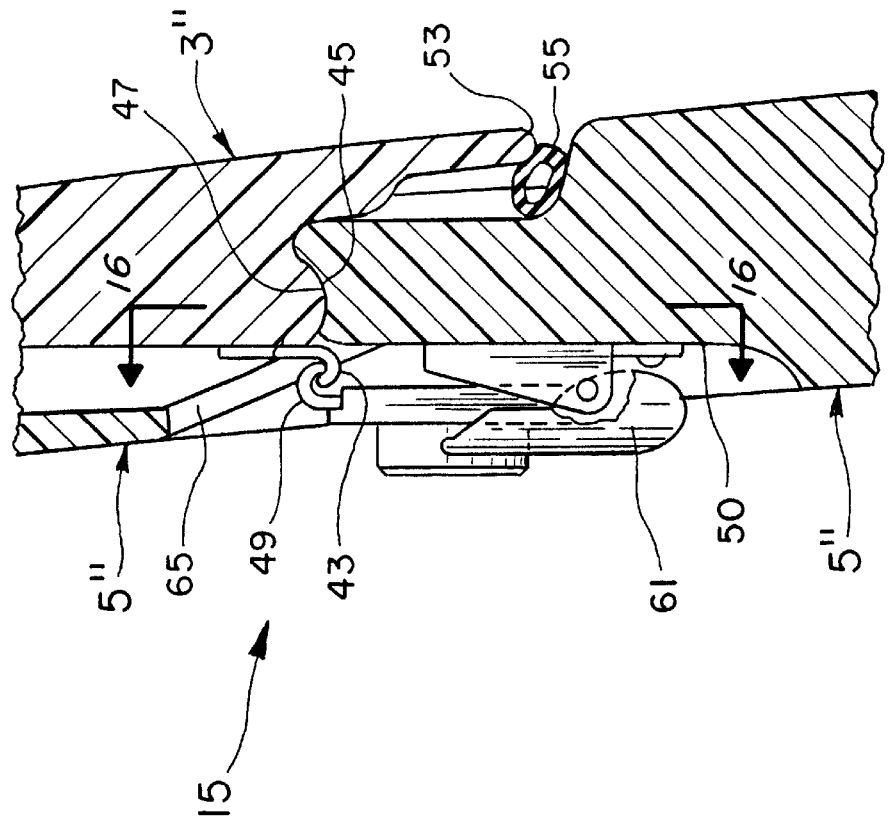
FIG. 11 is a view taken generally along line 12—12 of FIG. 10 but with the adjacent legs of the inverted U-shapes of the overlapping portions of the front and rear roof sections slightly spaced from each other.
Figure 12:
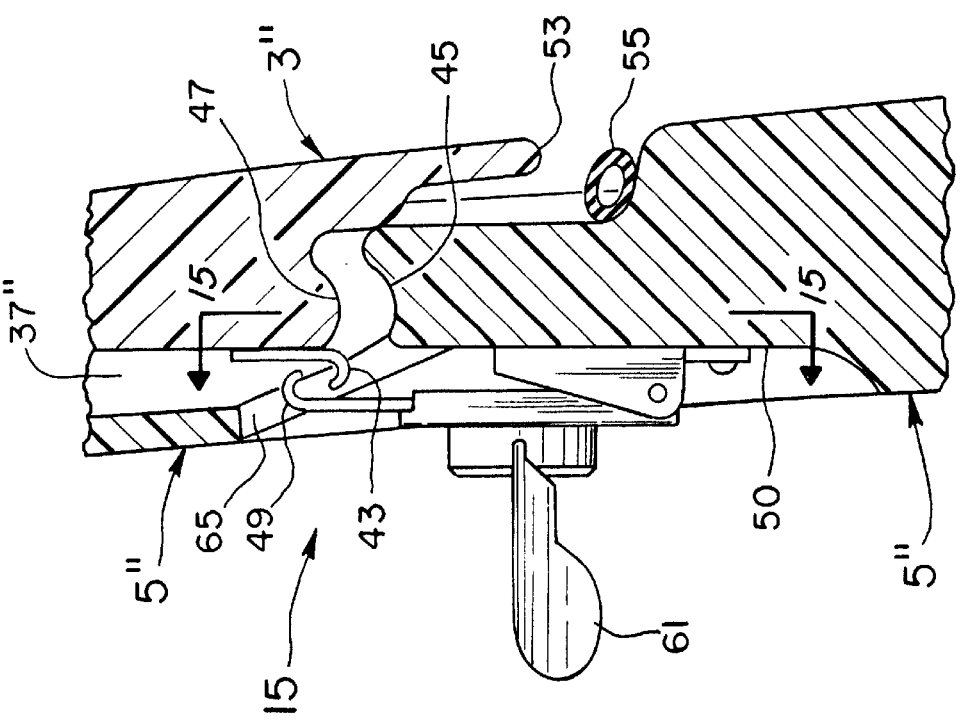
FIG. 12 is a view taken along line 12—12 of FIG. 10 showing the positioning of the overlapping legs of the front and rear roof sections when they are secured to each other.

As best seen in FIGS. 10–12, the front roof section 3 of the hardtop 1 is removably securable to the rear roof section 5 by side latches 15. The rear roof section 5 in turn is normally removably bolted in place to the rear frame of the vehicle 2 such as at 16 in FIG. 1. Referring again to FIG. 10 (which is a view taken along lines 10—10 of FIG. 4), the front and rear roof sections 3 and 5 have overlapping portions at 3' and 5' on the top and at 3" and 5" on the sides (see also FIG. 6). As perhaps best seen in this FIG. 6, each of these overlapping portions of the front and rear roof sections has an inverted substantially U-shape. The front roof section 3 in this regard in FIG. 6 has a substantially horizontally extending base 3' of the inverted U-shape running between the vertically extending sides or legs 3" of the inverted U-shape. Similarly, the inverted U-shape of the rear roof section has a base 5' extending between the legs 5" in FIG. 6. The overlapping bases 3' and 5' extend across the top of the hardtop 1 and the overlapping legs 3" and 5" extend down each side. The overlapping legs or sides 3" and 5" are then secured to each other by side latches 15 in FIGS. 10–12.

The overlapping portions of the front and rear roof sections 3 and 5 in FIG. 10 have a flexible sealing member or gasket 37', 37" therebetween. The sealing member is preferably continuous and has a top portion 37' running across the top between the overlapping bases 3' and 5' (shown in solid lines in FIG. 10). The sealing member also has side portions 37" extending down each side between the overlapping legs 3" and 5" as shown in dotted lines in FIG. 10 (see also FIG. 13). In operation, the rear roof section 5 is preferably first attached at bolts 16 in FIG. 1 to the rear of the vehicle 2 and then the front roof section 3 is positioned as generally shown in FIG. 10 with the bases 3' and 5' and legs 3" and 5" overlapping. The latches 15 on each side are then manually operated to draw the front roof section 3 at the overlapping bases 3' and legs 3" downwardly against the respective gasket portions 37' and 37" into a tight, nesting engagement with the mating base 5' and legs 5" of the rear roof section 5.

Figure 13:
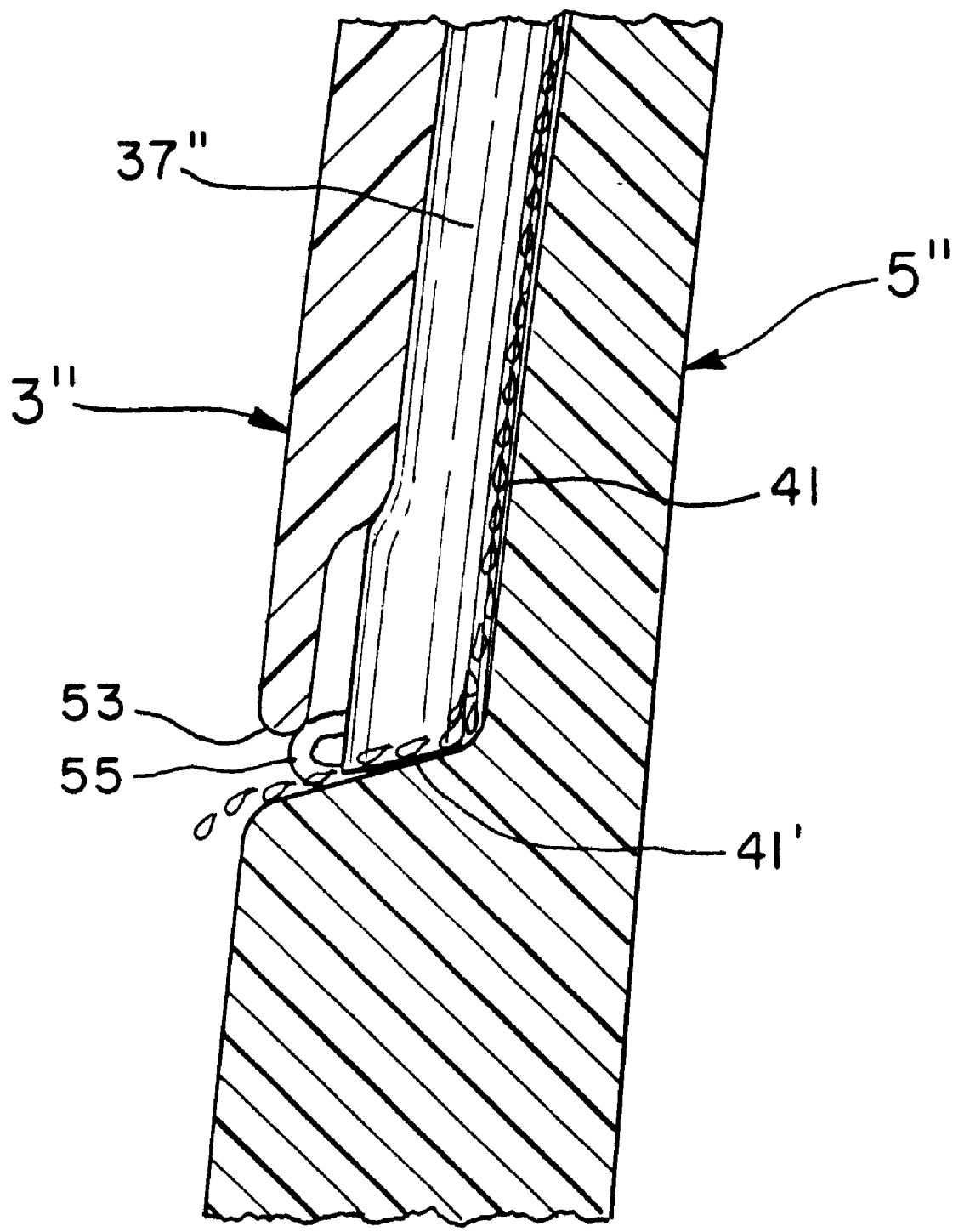
FIG. 13 is a view taken along line 13—13 of FIG. 10.

In doing so, an open gutter 41 in FIG. 10 is purposely created to capture and direct water across the top of the hardtop 1 and down the sides thereof. That is, the gutter 41 formed by the rear roof section 5 in FIG. 10, the sealing or gasket portions 37' and 37", and the front roof section 3 at 3' and 3" will serve to collect any water between the roof sections 3 and 5. On the top, the gutter 41 will direct the water laterally or horizontally outwardly from between the front and rear roof sections 3 and 5. The water is then directed vertically down each side between the front and rear roof sections 3 and 5 adjacent the legs 3" and 5" of the overlapping portions (see FIG. 13). From there, the water is directed and discharged away from the sealed front and rear roof sections 3 and 5. The gutter 41 also has an inverted U-shape and as shown in FIGS. 10 and 13, the bottom of each leg 41' of the U-shaped channel or gutter 41 is inclined downwardly and outwardly at 41' to enhance this discharge. This also helps to prevent any puddling or collecting of the water in the gutter 41, particularly in the area of 41'.

Referring again to FIG. 10, the base 3' and legs 3" of the front roof section 3 that extend over the underlying base 5' and legs 5" of the rear roof section 5 are pulled downwardly into an engaged position by each side latch 15. More specifically as best seen in FIG. 11 (which is a view taken generally along line 12—12 of FIG. 10 but with the overlapping legs 3" and 5" slightly spaced from each other), each leg 3" of the overlapping portion of the front roof section 3 has a depending hook member 43. This depending hook member 43 is engagable with the mating hook member 49 on the leg 5" of the overlapping portion of the rear roof section 5. In operation, the engagable member 49 on leg 5" is initially raised to the position of FIG. 11. Thereafter, the member 49 is lowered to engage hook member 43 and draw the hook member 43 and attached leg 3" downwardly from the position of FIG. 11 to the lowered position of FIG. 12. In doing so, the recessed (e.g., concave) pocket 45 on each leg 5" in FIGS. 11 and 12 (see also FIG. 14) helps to locate or index the mating or protruding (e.g., convex) member 47 on the leg 3" (see again FIGS. 11 and 12). This initial positioning and aligning are done manually after which the hook or clip on the engagable member 49 of side latch 15 in FIG. 11 is lowered from the extended position of FIG. 11 downwardly to the retracted position of FIG. 12. The aligning arrangement of 45 and 47 continues to guide or aid the proper positioning of the roof sections 3 and 5 into the predetermined, final alignment of FIG. 12 as the leg 3" is drawn downwardly by the retracting hook member 49. In the retracted position of FIG. 12, the hook member 49 on leg 5" is then fully engaged and locked with the hook 43 on the leg 3". In this manner, the base 3' and legs 3" of the overlapping portion of the front roof section 3 are pulled downwardly to nest and sealingly engage the underlying base 5' and legs 5" of the rear roof section 5. During this movement, lip 53 on the leg 3" in FIGS. 11–13 preferably engages the seal member 55.

Figure 15:
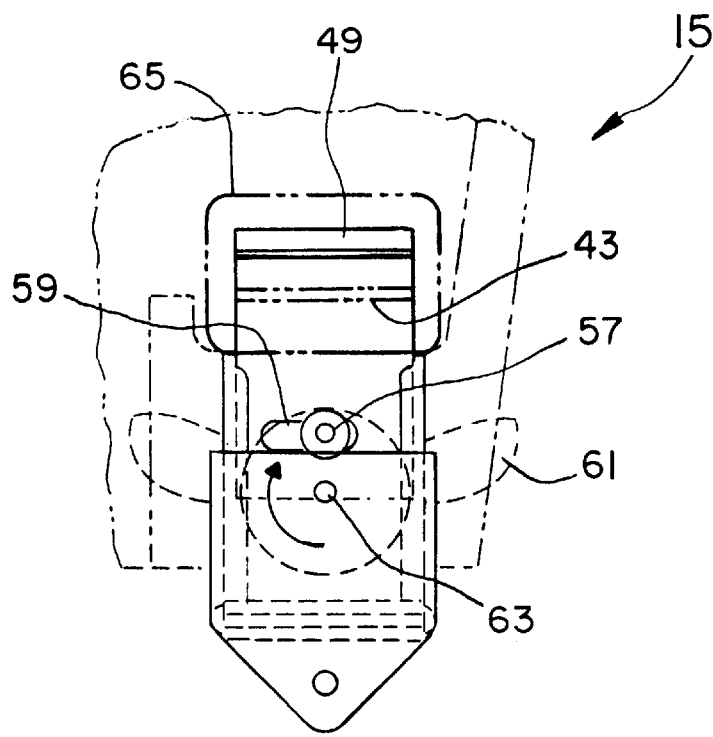
FIG. 15 is a view taken along line 15—15 of FIG. 11.
Figure 16:
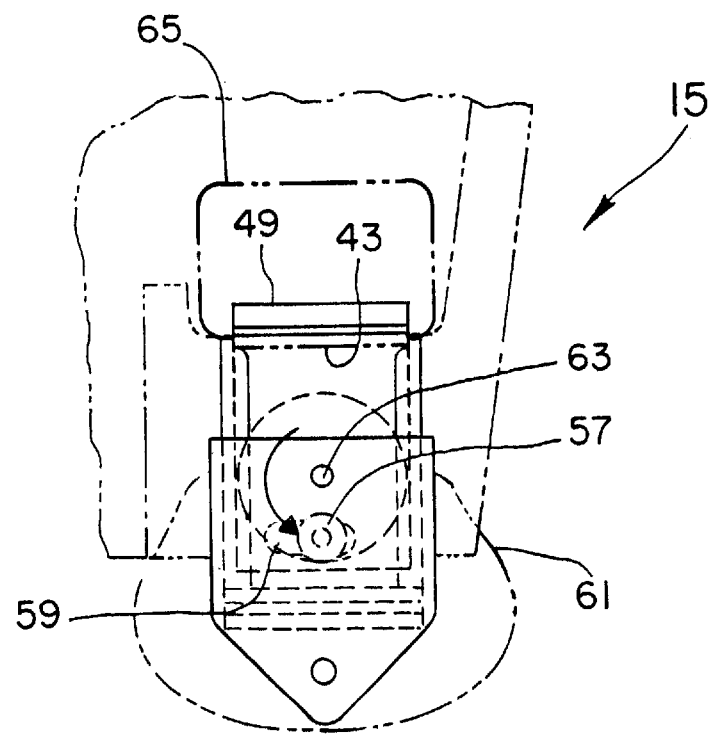
FIG. 16 is a view taken along line 16—16 of FIG. 12.

Each side latch 15 itself is conventional and has a cam 57 and follower 59 arrangement (see FIGS. 15 and 16). FIG. 15 in this regard shows the latch 15 in the raised position of FIG. 11 and FIG. 16 shows the latch 15 in the lowered, secured position of FIG. 12. In use, the control handle 61 of the latch 15 is first pivoted outwardly to the position shown in FIGS. 11 and 15. Handle 61 is then turned clockwise in FIG. 15 to rotate the cam 57 about the axis 63. This lifts or raises the hook member 49 of the latch 15 to the extended position of FIGS. 11 and 15. Subsequently, the handle 61 is turned counterclockwise as in FIG. 16 to lower the hook member 49 to engage the hook member 43 and draw the front and rear roof sections 3 and 5 together. The handle 61 is subsequently pivoted downwardly to the position of FIGS. 12 and 16 to secure the sections 3 and 5 in place. A novel feature of the present invention involves this drawing mechanism and the manner in which the front roof section 3 is so drawn by side latches 15 downwardly onto the rear roof section 5.

Figure 14:
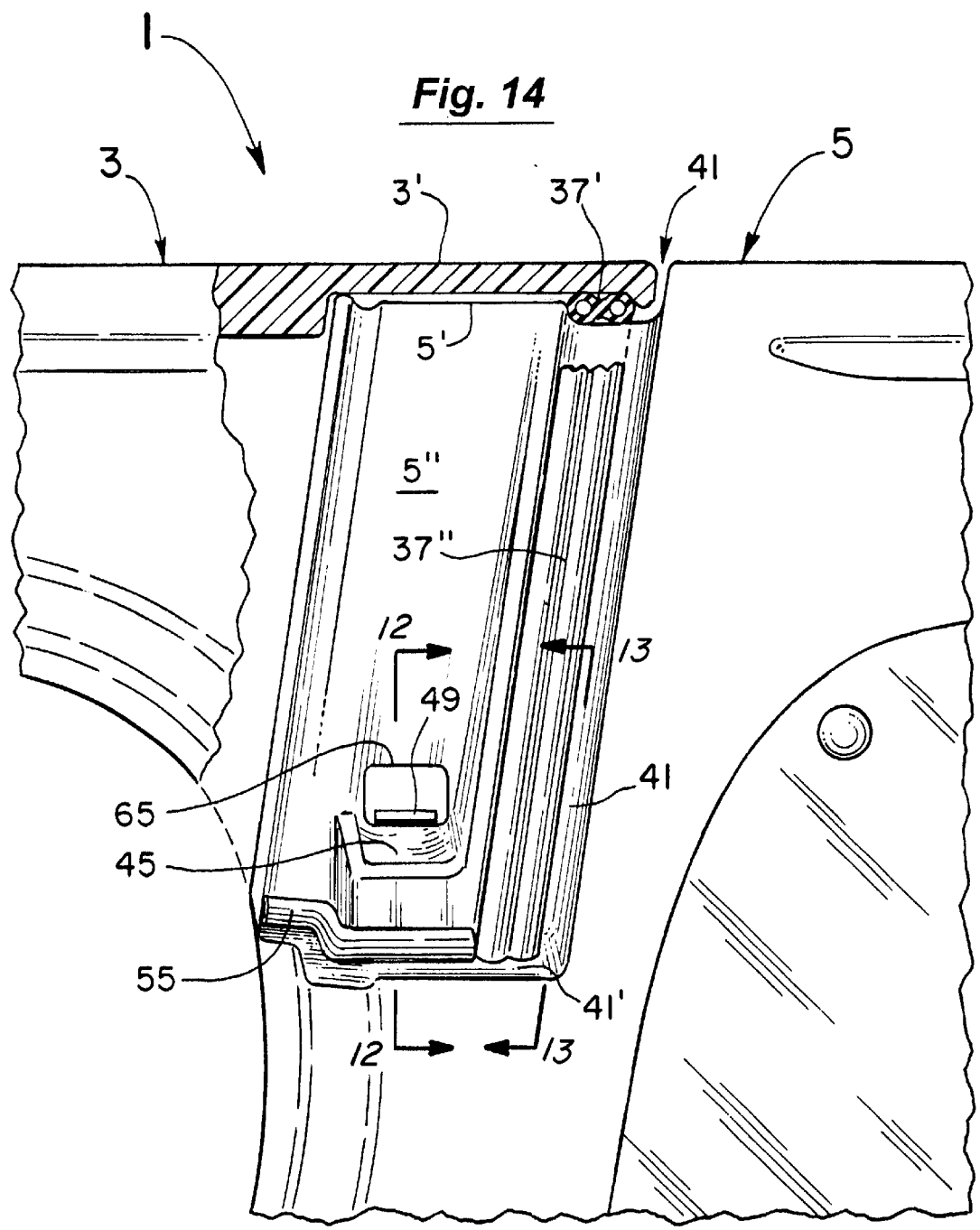
FIG. 14 is a view similar to FIG. 10 with the overlapping leg of the front roof section removed for clarity to show the indexing structure on the leg of the underlying rear roof section.

That is, the underlying leg 5" in FIG. 14 acts as a B-pillar and the engaging hook member 49 of the side latch 15 on the leg 5" actually extends through a hole or cutout 65 in the leg 5" (see also FIGS. 11 and 12) to reach and engage the hook member 43 on the overlapping leg 3". This adds strength to the engagement and does so in a manner that permits each engaged side latch 15 to be within the B-pillar or leg 5" front-to-back. Each side latch 15 is also almost completely received out of the way in recess 50 in FIG. 12 in each inner side of the B-pillar or leg 5". The securing arrangement of side latches 15 with hook members 43 and 49 fully engaged and locked together thus provides an efficient and strong attachment of the front and rear roof sections 3 and 5 to each other.

Figure 17:
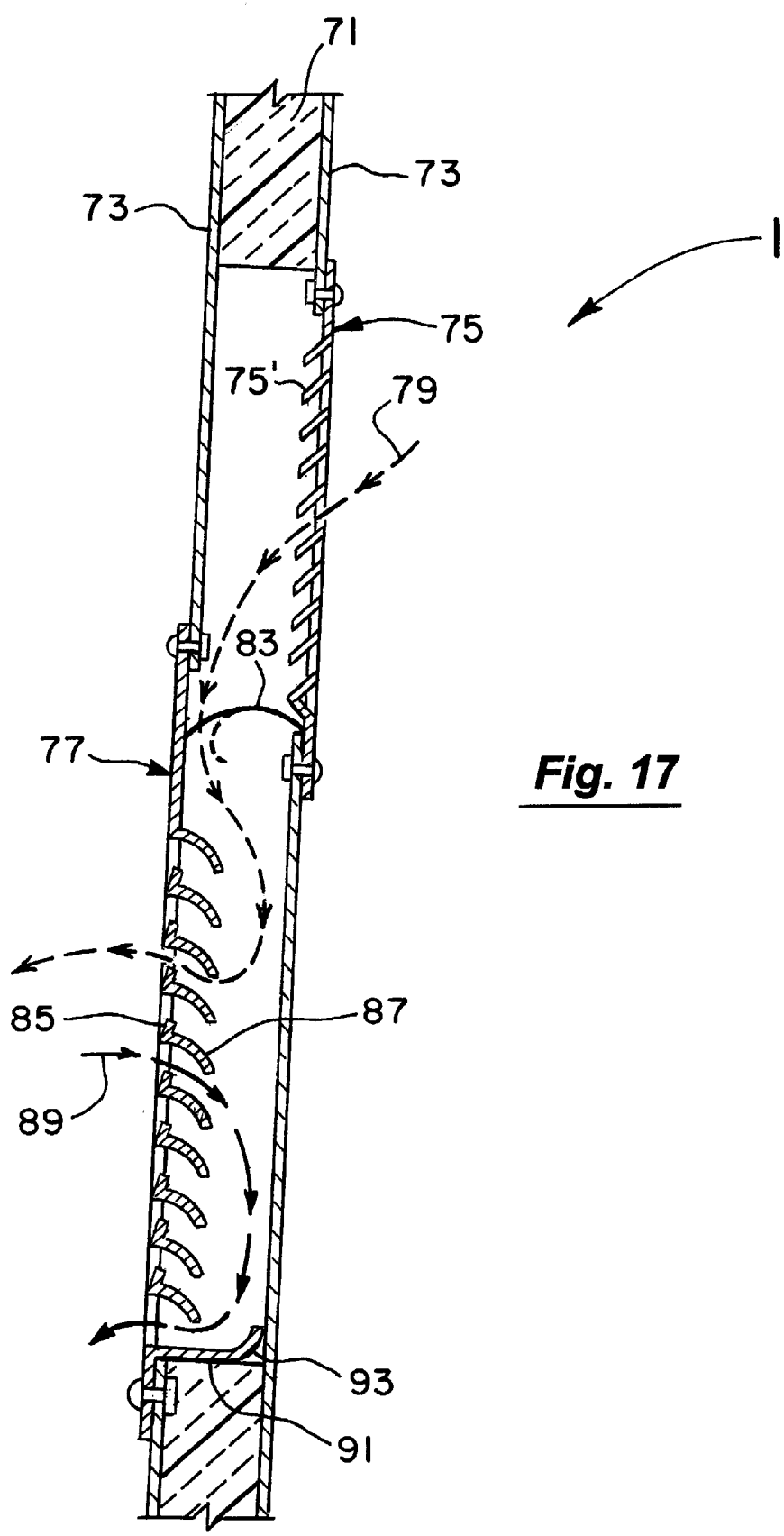
FIG. 17 is a cross-sectional view of the vent of the present invention taken along line 17—17 of FIG. 2.

As best seen in FIG. 17, the hardtop 1 itself can be made of a foam composite material 71 (e.g., urethane structural foam) encased in skins 73 of hard thermoplastic material (e.g., ABS). As also shown in FIG. 17 (which is a view taken along line 17—17 of FIG. 2), a substantially waterproof vent is provided through each rear side of the hardtop 1. The vent can be made by cutting or milling out staggered sections of the hardtop 1 from each side and then covering the cutouts with vertically staggered diffusers 75 and 77. As air pressure increases inside the vehicle from shutting a door or running the fan, air can pass from the interior of the vehicle outwardly passed the spaced-apart louver members 75' of the diffuser 75 which is in fluid communication with the vehicle interior (as shown by the dotted arrows 79 in FIG. 17). Once inside the vent, the air can pass by the one-way valve (e.g., flexible lip member or seal) 83 and out the diffuser 77 on the exterior side of the vent. To help prevent any backflow of water (e.g., from rain or a carwash) into the vehicle through the vent in the reverse direction, the louver members 85 of the outside diffuser 77 are provided with inwardly and downwardly directed or curved portions 87. Water entering from the outside along path 89 is then diverted or directed downwardly to a draining area adjacent the bottom member 91 of the vent and out through the bottom of the outer diffuser 77 as shown in FIG. 17. To aid this draining, the bottom member 91 is provided with a downwardly and outwardly curved or inclined portion 93 running substantially between the interior and exterior sides of the vent.

While several embodiments of the present invention have been shown and described in detail, it to be understood that various changes and modifications could be made without departing form the scope of the invention.

We claim:

1. A substantially waterproof air vent for a vehicle to allow air to pass from the interior of the vehicle outwardly through the vent and to substantially prevent water from passing from the exterior of the vehicle through the vent to the interior of the vehicle, said vent having an interior side and an exterior side spaced from each other and top and bottom members spaced from each other, said interior side of the vent being adjacent the interior of the vehicle and including a diffuser in fluid communication therewith and having spaced-apart louver members, said exterior side including a diffuser with spaced-apart louver members allowing air and water to pass therebetween, said louver members of the diffuser on the exterior side including inwardly and downwardly extending portions to direct any incoming water downwardly toward the bottom member of the vent, said vent having a draining area adjacent the bottom member to direct water outwardly of the vent wherein the diffusers are vertically staggered relative to each other.

2. The vent of claim 1 wherein said louver members of the diffuser on the exterior side are curved downwardly.

3. The vent of claim 1 wherein said draining area directs the water through the exterior side of the vent to the exterior of the vehicle.

4. The vent of claim 3 where in the bottom member of the vent is downwardly and outwardly curved from adjacent the interior side of the vent to the exterior side of the vent to aid in directing the water outwardly of the vent through the exterior side thereof.

5. The vent of claim 1 further including a one-way valve between the interior and exterior sides of the vent substantially restricting the flow of air to one direction through the vent from the interior side to the exterior side of the vent.

6. The vent of claim 5 wherein said one-way valve is a flexible lip member.

7. The vent of claim 1 wherein the diffuser on the interior side is positioned vertically higher than the diffuser on the exterior side.

* * * * *